Sept. 8, 1936. A. W. SEYFRIED 2,053,848
OIL SYSTEM FOR BEARINGS
Filed Sept. 12, 1934  3 Sheets-Sheet 1

INVENTOR.
ARTHUR W. SEYFRIED
BY Edmund J. De Pas
his ATTORNEY.

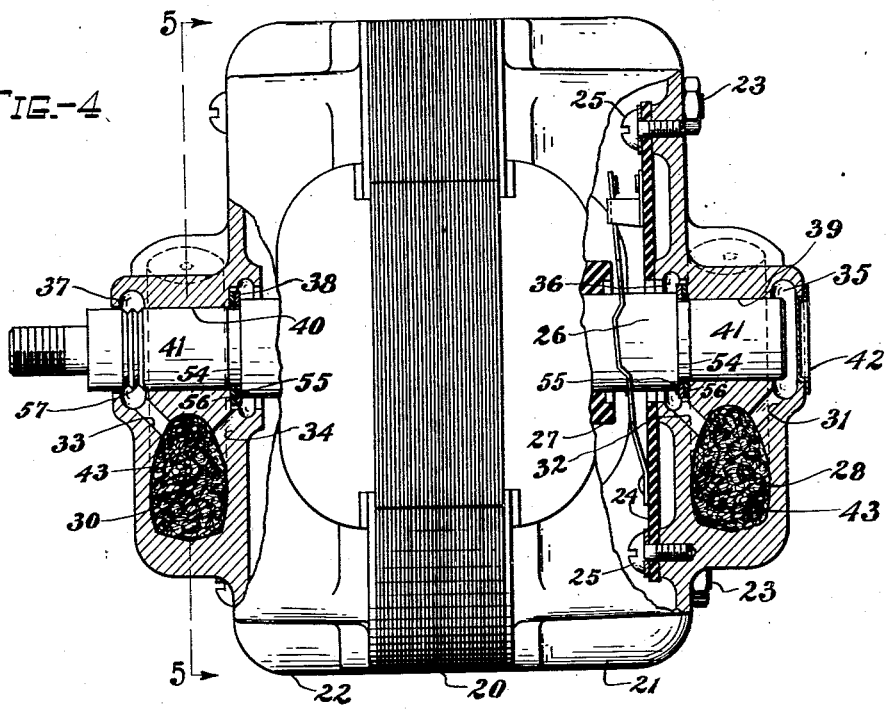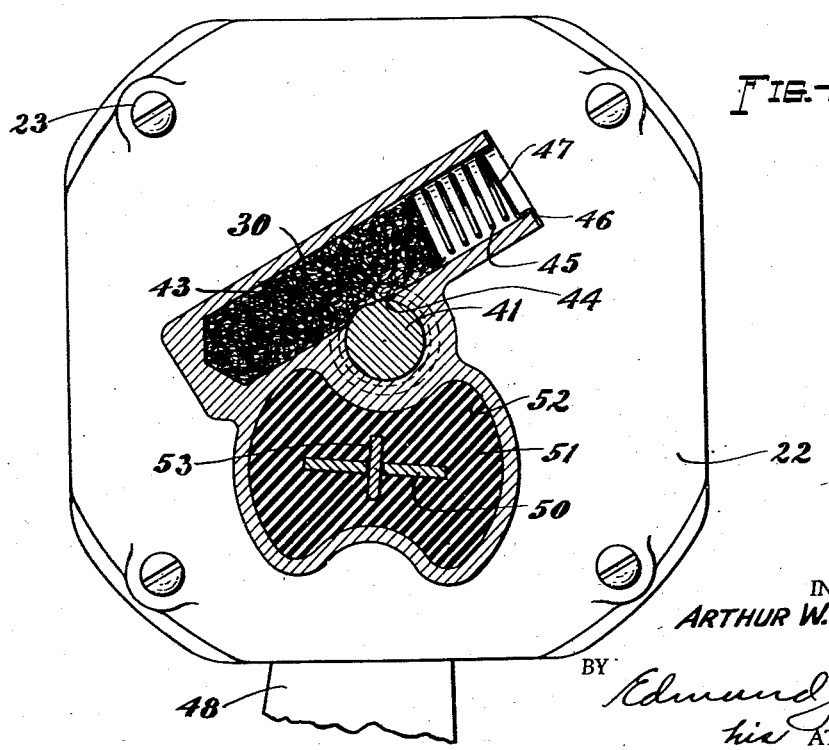

Sept. 8, 1936. A. W. SEYFRIED 2,053,848
OIL SYSTEM FOR BEARINGS
Filed Sept. 12, 1934 3 Sheets-Sheet 3
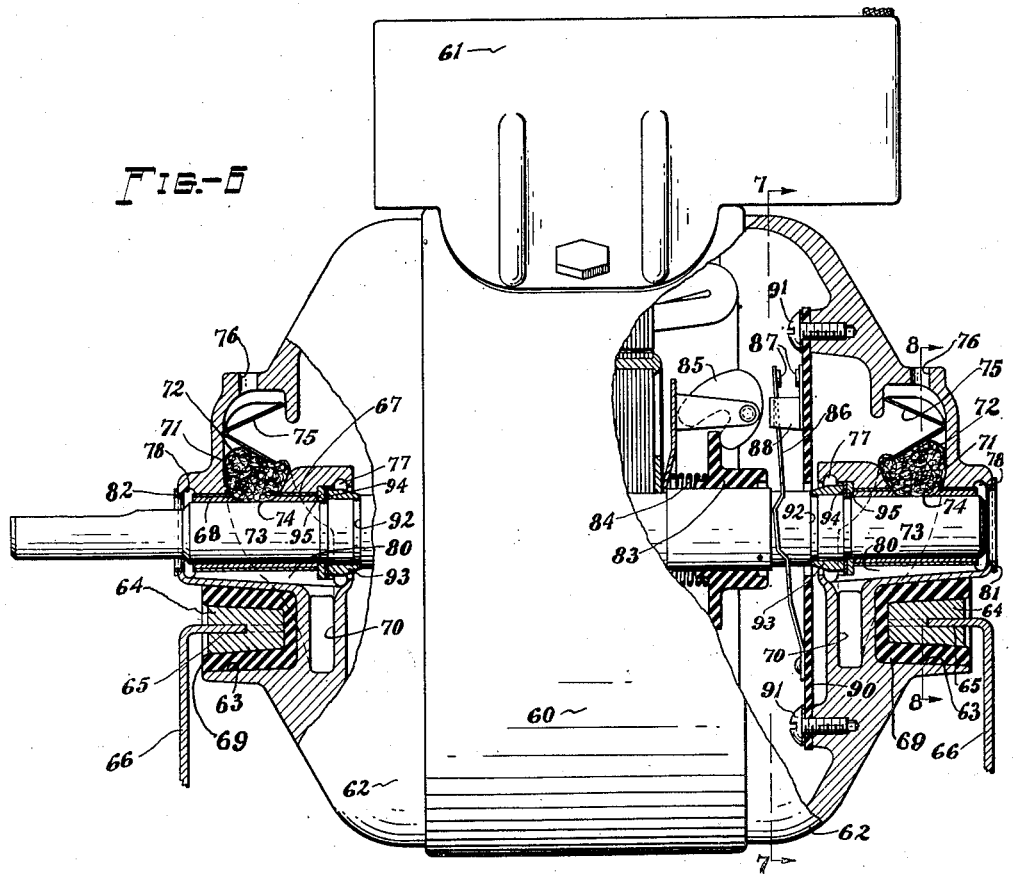
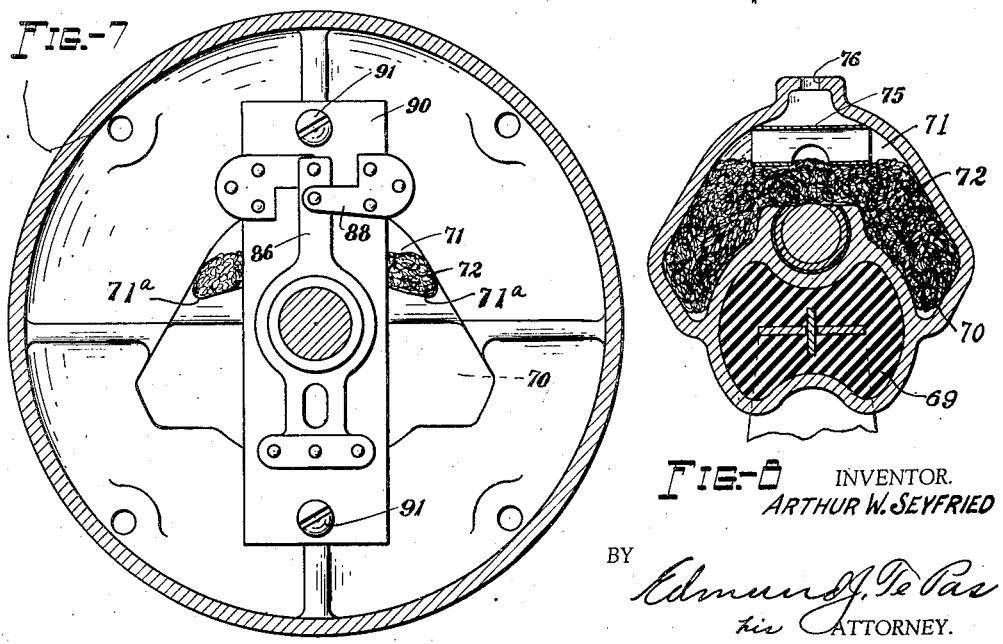
INVENTOR.
ARTHUR W. SEYFRIED
BY
his ATTORNEY.

Patented Sept. 8, 1936

2,053,848

UNITED STATES PATENT OFFICE 2,053,848

OIL SYSTEM FOR BEARINGS

Arthur W. Seyfried, Cleveland, Ohio, assignor to
The Apex Electrical Manufacturing Company,
Cleveland, Ohio, a corporation of Ohio Application September 12, 1934, Serial No. 743,728

14 Claims. (Cl. 308—125)

This invention relates to bearing oiling systems and in particular to oiling systems for the bearings of electric motors.

One of the objections to the plain bearing electric motor of the size commonly used in connection with labor-saving household appliances lies in the necessity of frequently oiling the motor bearings. Lack of attention to this detail shortens the life of the motor and harmfully reflects on the quality of the appliance of which the motor forms a part.

It is an object of this invention to provide in a simple and inexpensive manner, a self-contained oiling system for electric motor bearings which will permit the operation of the motor over long periods of time without re-oiling the bearings, and which arrangement prevents the lubricating oil from coming in contact with the operating parts of the motor either by the action of the motor itself or through personal carelessness in effecting the oiling operation.

Stated in general terms the invention consists in forming an electric motor cap casting, with an open oil retaining chamber for the reception of the motor bearing and an oiling wick, such chamber having provisions for the return of used oil to the wick and for directing any overflow of oil from the chamber away from the operating parts of the motor, the parts of such casting being designed so as to require a minimum number of machining operations and arranged to permit the ready installation of the oiling wick and its spring.

With these and other objects in view, the invention consists in the novel construction, arrangement and combination of parts, hereinafter illustrated and described in some of its embodiments in the accompanying drawings, and particularly pointed out in the appended claims.

Figure 1:
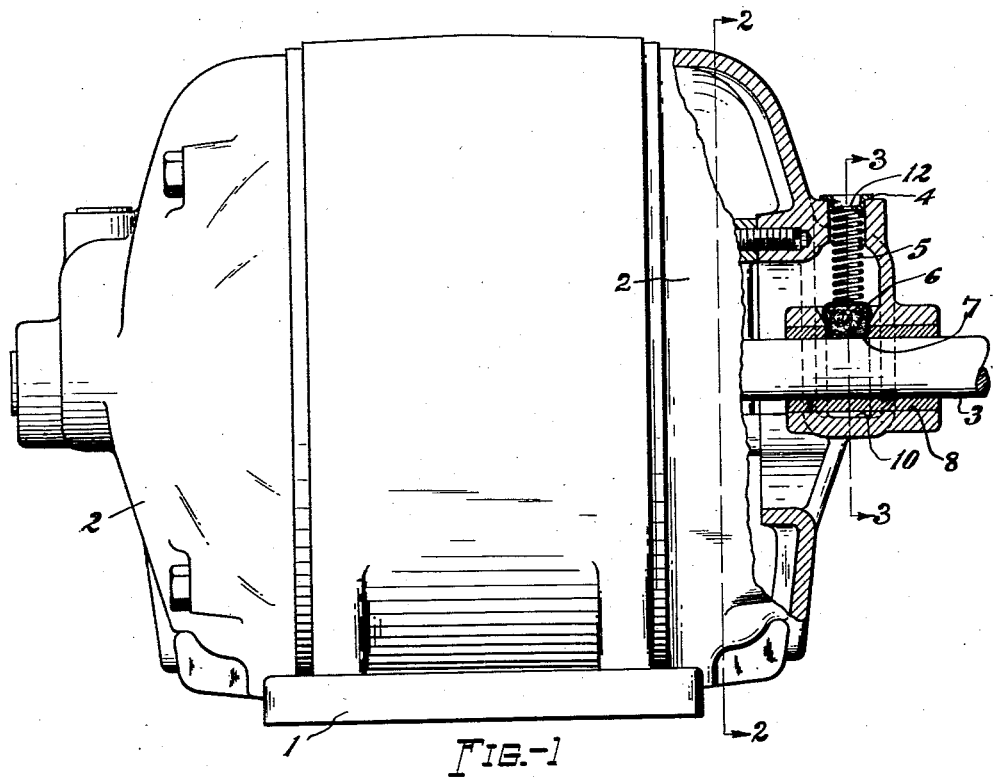
Figure 2:
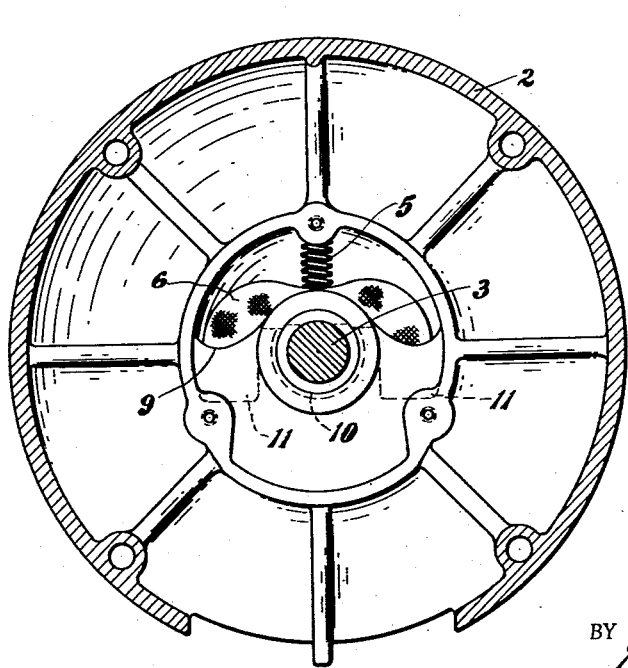
Figure 3:
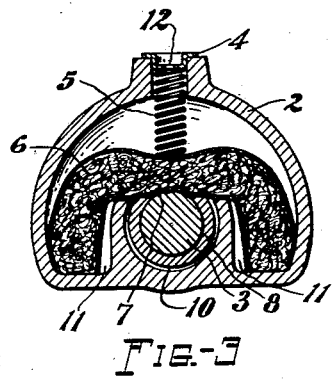

Referring to the drawings, Fig. 1 shows a side elevational view, partly in section, of an electric motor employing the improved oiling system to which this invention relates. Fig. 2 is a sectional view of the motor cap taken on line 2, 2 Fig. 1. Fig. 3 is a sectional view of motor cap taken on line 3, 3 Fig. 1 showing in detail the bearing oiling system. Fig. 4 is a side elevational view, partly in section, of an electric motor illustrating a modification of the invention. Fig. 5 is a sectional view taken on line 5, 5 Fig. 4 with the parts rotated 90° in a clockwise direction. Fig. 6 is a side elevational view of an electric motor illustrating another modification of the invention. Fig. 7 is a sectional view taken on line 7, 7 Fig. 6 and Fig. 8 is a detail sectional view taken on line 8, 8 Fig. 6.

In the form of the invention shown in Figs. 1 to 3, the motor 1 shown in connection therewith, may be of any desired type, having end caps 2 formed from single castings which are adapted to support the motor armature shaft 3 in suitable bearing bushings 8. These bearings are each cut away at their upper side to form an opening 7 for the oil wick 6 to contact with the shaft 3 and to lubricate the bearing. If desired, the bearings may be in the form of sleeves integral with the end caps as shown in some of the other figures of the drawings.

The oil wick 6 may be made from any suitable material such as cotton or wool felt or cloth capable of conveying oil from the bottom of the wells 11 to the aperture 7. The wells are located one on each side of the motor shaft and they constitute a lubricant reservoir of considerable capacity.

A spring 5 engages the wick at a point above the aperture 7, holding it in contact with the shaft 3, preventing dirt and grit from getting into the bearing at this point, and at the same time effectively oiling the bearing.

A cap 4, having an oil hole 12, is driven in a suitable aperture above the motor bearing and provides an abutment for the spring 5. The motor cap 2 is provided with an annular recess 10 intermediate the bearing ends so that the bearing may be supported at each of its ends instead of along its entire length.

The upper edges 9, of the inner wall of the oil reservoirs 11, are downwardly curved to allow excess oil to overflow and escape from the reservoir without coming into contact with the operating parts of the motor. The level of the edges 9 is placed below the level of the aperture 7 so that all oiling of the bearing is accomplished by capillary attraction through the wicking 6. This arrangement protects the bearing from excessive oiling and obviates the danger of having oil thrown onto the commutator and brushes of the motor.

By having the inner wall of the oil reservoir cut away as shown, the spring 5 and wicking 6 may be readily removed or replaced. All of the openings and holes shown in connection with the oiling system carried by the motor cap, are formed in the casting of the cap so that the only machining operations necessary on this part are the reaming of the openings for the bearing bushing 8 and the oil cap or plug 4.

This application constitutes a continuationin-part of my application Serial No. 380,810 filed July 25, 1925 for Oiling system for bearings, which application was abandoned on March 21, 1935. The structure described above corresponds to the structure disclosed in my aforesaid application.

The above construction through the elimination of assembly operations, excess parts and costly machining operations will materially reduce the cost of the finished motor and at the same time provide a simple, effective oiling system that is unaffected by dust and dirt and which will satisfactorily lubricate the motor for a long period of time without re-oiling.

In the form of the invention illustrated in Figs. 4 and 5, there is shown an electric motor 20 having end caps 21 and 22 secured to the motor structure by any suitable means such as the bolts 23, 23. A plate 24 is secured to the end cap 21 by screws 25, 25. This plate carries a cut-out switch 26 for certain of the windings of the motor and the movement of the switch is controlled by a centrifugally operated device 27 which serves to open the switch after the motor has attained a predetermined speed.

The motor end caps 21 and 22 are provided with similarly formed lubricating provisions comprising cavities 28 and 30 which communicate by way of passageways 31, 32, 33 and 34 with annular channels or annular spaces 35, 36, 37 and 38 located adjacent the ends of the bearings 39 and 40 which are formed in the end caps 21 and 22 respectively. The cavities 28 and 30 of the end caps may be formed in the casting of the end caps at the time the same are cast, or if preferred, such cavities may be drilled in the castings after they are cast. The passageways 31, 32, 33 and 34 may be formed most easily by drilling, although if desired, these too may be formed in the casting operation.

The shaft 41 of the motor is journaled in the bearings 39 and 40. The shaft 41 of the motor projects through the end cap 22 and the opening in the end cap 21 adjacent to the other end of the motor shaft is closed by means of a cap 42. The cavities 28 and 30 incline slightly from the vertical, as is best shown in Figure 5, and they are closed at their bottom ends to form a well for the storage of lubricant. A suitable member of fibrous oil-absorbing material 43 is fitted in each of the cavities 28 and 30.

The material 43 contacts the motor shaft 41 by way of an opening 44 communicating with the oil cavity. The oil retaining material 43 is pressed against the shaft 41 by means of a spring 45 which is held against such material by a cap 46 received in the outer end of each of the respective cavities, and these caps are provided each with an oil hole 47 by way of which lubricant can be supplied to the oil retaining material in the respective cavities.

The motor support comprises a pair of horizontal supporting arms, one of which is indicated by the numeral 48. The outer ends of the horizontal supporting arms are turned inwardly as at 50 and these portions of the arms are received in a block of rubber 51 carried in the recesses 52 formed in the end caps of the motor. The inturned parts of the arms are slotted for reception of a cross-plate 53 which is provided to restrain to a greater extent the movement of the motor on its flexible supporting blocks. Shoulders 54, 54 are provided adjacent the opposite ends of the motor shaft and these shoulders engage metal washers 55, 55 which serve to press oil retaining felt washers 56, 56 around the openings formed by the ends of the bearings 39 and 40. Oil escaping past the washers just described will be thrown into the channels 36 and 38 from where it is returned to the cavities or oil reservoirs 28 and 30.

By reason of the arrangement shown, it is possible to provide enough lubricant in the cavities shown, to lubricate the motor for indefinite periods of time. Oil escaping from the bearings 39 and 40 is returned to the cavities 28 and 30 by way of the passageways 31, 32, 33 and 34, and in this manner, the lubricant is used over and over again, thereby lessening the consumption of oil. The part of the motor shaft 41 which projects from the end cap 22 is grooved at the point which lies in the annular chamber 37 so as to form an annular ridge or drip ring 57 which serves to throw off oil which has worked its way along the shaft from the bearing 40, such oil being returned to the oil cavity 30 by way of the passageway 33.

In the form of the invention illustrated in Figs. 6 to 8 inclusive, there is shown a condenser type motor 60 having a condenser 61 carried on top of the motor. The end caps 62, 62 of this motor are formed with similar recesses 63, 63 which are provided for reception of yielding, flexible supporting blocks 69, 69 into which project the inturned portions 65, 65 and cross-pieces 64, 64 of the motor supporting bracket 66, 66.

Axial openings are provided in the end caps for reception of suitable bearing members or bushings which are formed from a thin flat strip of steel 67 which is heavily coated with babbitt or bearing metal 68 and after the strip has been rolled up to form the bushing, it is pressed into the axial openings formed in the end caps 62, 62. A lubricant chamber comprising interconnected cavities 70 and 71 is formed about the axial openings of each of the end caps. These cavities extend entirely around the bearings and a suitable oil retaining absorbent material 72 is packed in most of the space defined by them. The upper cavity 71 is open on one side and the lower edge 71ª of such opening is arranged in much the same manner as for the device shown in Fig. 3 so excess oil can overflow at this point.

The material 72 contacts with the shaft 73 of the motor by way of openings 74, 74 provided in the top part of each of the bearings through which the material 72 is pressed by means of springs 75, 75. The end caps are provided with corresponding oil holes 76, 76 by way of which oil may be supplied to the material 72 and thus to the portion of the shaft in contact therewith.

The lower part 70 of each of the lubricant cavities communicates with annular oil collecting spaces 77 and 78 at the ends of the bearings by way of an axially arranged passageway 80 and these provisions serve to return lubricant escaping from the ends of the bearings back to the cavity 70. The motor shaft 73 projects through the axial opening of one of the end caps 62 and the bearing aperture of the other end cap is closed by means of a cap 81. An annular washer 82 is fitted to the end cap around the projecting end of the shaft to prevent the escape of lubricant at this point.

An axially movable member 83 is carried on the shaft 73 and it is urged in one direction by means of a spring 84 and in an opposite direction thereto by means of centrifugally actuated pivoted weights 85 which are carried by the motor shaft so that when the motor has attained a predetermined speed, the member 83 is moved axially along the shaft away from a spring-operated cut-out switch 86 which serves to cut out some of the windings of the motor. The contacts for this switch are indicated by the numeral 87 and a stop 88 is provided to restrain the movement of the switch spring in one direction.

The switch just described is carried on a plate 90 which is secured to its end cap by means of screws 91, 91. The motor shaft 73 has oppositely facing shoulders 92 each of which is engaged by one end of an annular ring 93, in contact at its other end with an annular washer 94 which in turn presses a felt washer 95 against one end of the bearing member carried by the respective end caps.

The form of the invention just described is also provided with an oil reservoir of considerable capacity and as the oil is returned continuously to this reservoir after its use, the motor will operate for an indefinite period of time before its oil supply needs to be replenished.

The forms of the invention illustrated in Figs. 4 to 8 include in addition to the large capacity oil reservoirs just mentioned, sealing means such as the washers shown, to prevent oil from getting on the operating parts of the motor and to insure the return to the oil reservoir of oil escaping from one end of the bearings. Means too are provided at the other end of the bearings for the return of oil escaping thereat and as the oil is used over and over again, a very small amount of oil will effectively lubricate the motor for a long time.

Furthermore, it is to be understood that the particular forms of oiling system for bearings shown and described, and the particular procedure set forth are presented for purposes of explanation and that various modifications of said apparatus and procedure can be made without departure from this invention as described in the appended claims.

I claim:

1. A casing for an electric motor comprising an integrally formed cast-metal end-cap and bearing-support having an axial bearing-aperture traversing an open-topped oil well or pocket cored in the inner face of said end-cap, a bushing carried in said aperture and having an oil opening in the side thereof, said end-cap having passageways for the return to the oil well of oil escaping from the ends of said bushing, and an oil-conveying wick extending from the bottom of the oil-well and covering the opening in said bushing, said wick being freely insertable and removable by way of the open top of the well with said bushing in its operative position.

2. An integrally formed cast-metal end-bell or end-cap for an electric machine having centrally located spaced pockets or oil-wells formed on the inner face thereof and separated from each other by an axially disposed sleeve having an opening in its top adjacent to said wells, said end-cap having provisions for effecting communication with said wells at their lower level and for the return to said wells of lubricant escaping from the ends of said sleeve, and capillary means for conveying lubricant from the bottom of said wells to the interior of said sleeve.

3. An end-cap and bearing support for an electric motor having a bearing aperture formed therein, means for securing said end-cap to a fixed part of the motor to provide a closure for one end thereof, an anti-friction bushing having an opening in its top side carried in said bearing aperture, said end-cap also having an open-topped oil-well or pocket formed in the side of the inner face of said cap at a point adjacent to said bearing aperture, said end-cap having annular spaces about the ends of said bushing in communication with the oil-well, and an oil conveying wick extending from the bottom of said oil-well to the top opening of said bushing, said wick being freely insertable and removable by way of the open-top of said well with said bushing in its operative position.

4. In an electric motor adapted to stand in a substantially horizontal position, a motor housing, an armature shaft supported by the housing, a bearing for the end of the shaft, a reservoir of substantial size surrounding said bearing having a relatively large open top inside said housing and a relatively small oil-filler hole outside said housing, a fibrous oil-absorbing material in the reservoir and extending from the lowermost part thereof into contact with the shaft, and passageways in the housing leading from both ends of the bearing to the reservoir for returning to the reservoir lubricant escaping from the ends of said bearing.

5. The combination with an electric motor having an armature shaft in horizontal position, a housing, bearings for the shaft carried by the housing at the opposite ends of the motor, reservoirs in the housing associated with each of the bearings opening into the interior of said housing and having a relatively small oil-filler hole outside said housing, a fibrous oil-absorbing material substantially filling the space in the reservoir and in contact with the shaft for conducting lubricant from the lowermost part of the reservoir to the shaft, the interior openings of said reservoirs of said housing being of a size and provided for the ready insertion or removal of said fibrous oil-absorbing material, oil collecting channels at the ends of the bearings, passageways connecting said channels with the reservoirs, and means on the shaft adjacent the opposite ends of the bearings for removing oil from the shaft and discharging it into said channels.

6. A cast metal end-cap and bearing-support for an electric motor comprising a bearing sleeve and having an open oil-well or pocket formed in the side of the end-cap adjacent to and spaced laterally of said sleeve and an oil-filler hole above said sleeve and communicating with said well, said sleeve having an opening in its upper face opposite said oil-hole, a wick leading from said oil-well to said opening, a spring engaging said wick and pressing it through said opening into contact with the shaft inside said sleeve, and an apertured abutment for said spring located in said filler-hole, said spring and wick being readily insertable and removable by way of the opening of said oil-well.

7. An end-cap and bearing support for an electric motor having a bearing aperture formed therein, means for securing said end-cap to a fixed part of the motor to provide a closure for one end thereof, an anti-friction bushing having an opening in its top side carried in said bearing aperture, said end-cap also having an open-topped oil well or pocket formed in the side of the inner face of said cap at a point adjacent to said bearing aperture, the top edge of said well providing overflow openings at a level just below the level of said bushing opening and discharging inside said end-cap, and an oil conveying wick extending from said oil well to the top opening of said bushing, said wick being freely insertable and removable by way of the open-top of said well with said bushing in its operative position.

8. An end-cap and bearing support for an electric motor having a bearing aperture formed therein, means for securing said end-cap to a fixed part of the motor to provide a closure for one end thereof, an anti-friction bushing having an opening in its top side carried in said bearing aperture, said end-cap also having an open-topped oil well or pocket formed in the inner face of said cap at one side of said bearing aperture and having both a visible filling opening and concealed overflow provisions, said filling opening facing upwardly and being accessible from the outside of said end-cap, said overflow provisions being defined by the top edge of said open well and located at a level just below the level of said bushing opening to permit excess oil to overflow from said well at a point remote from said bushing, and an oil wick extending from the bottom of the well to the top opening of said bushing, said wick being freely insertable and removable by way of the open top of the well with said bushing in its operative position.

9. A casing for an electric motor comprising an end-cap and bearing-support having parts defining an axial bearing-aperture traversing an open-topped oil well or pocket formed in the inner face of said end-cap, a bushing supported in said aperture having an oil opening in the side thereof located on a level just above the top edge of one of the inner walls of the oil well, and an oil-conveying wick accessible by way of said open oil well and extending from the bottom of the oil well and covering the oil opening of said bushing.

10. A casing for an electric motor comprising an integrally formed cast-metal end-cap and bearing-support having an axial bearing-aperture traversing an open-topped oil well or pocket cored in the inner face of said end-cap, a bushing carried in said aperture and having an oil opening in the side thereof at a point just above the top edge of one of the inner side walls of said oil well, and an oil-conveying wick extending from the bottom of the oil well and covering the opening in said bushing, said wick being freely insertable and removable by way of the open top of the well with said bushing in its operative position.

11. A motor casing comprising an integrally formed cast-metal end-cap and bearing-support for one end of the motor casing having a bearing-aperture therethrough and a concealed open-topped oil-well cored in the inner face of said end-cap at one side of said aperture, the walls of said oil-well being formed in part by a wall spaced inwardly of the end-cap and having its upper edge terminating below the uppermost part of said bearing-aperture, a bushing located in said aperture and having an oil opening in the side thereof, and an oil-conveying wick extending from said oil well to the oil opening of said bushing, the top edge of the inwardly spaced wall of said open oil-well being located on a level just below the oil opening of said bushing for preventing the supplying of excessive amounts of lubricant to the bushing.

12. An integrally formed cast-metal end-bell or end-cap for an electric machine having a centrally located pocket or oil well formed on the inner face thereof alongside an axially disposed sleeve having an opening in its top adjacent to said well, said well having a wall spaced axially inwardly of the end-cap wall with its upper edge terminating below the sleeve opening so as to determine a level for liquid lubricant below such opening.

13. An integrally formed cast-metal end-bell or end-cap for an electric machine having centrally located spaced pockets or oil wells formed on the inner face thereof and separated from each other by an axially disposed sleeve having an opeing in its top adjacent to said wells, said wells having walls spaced axially inwardly of the end-cap wall with their upper edges terminating below the sleeve opening so as to determine a level for liquid lubricant below such opening.

14. An integrally formed cast-metal end-cap and bearing-support for an electric motor having provisions for its securement to the motor and characterized by its having a horizontal bearing sleeve and an open-topped oil-well cored in the inner face of said end-cap alongside of said sleeve, said sleeve having an oil-receiving opening formed in the upper intermediate part of the sleeve, said oil-well being defined in part by an inwardly spaced wall having its upper edge terminating below the oil-receiving opening of said sleeve so as to determine a lubricant level below such opening, a bearing bushing in said sleeve having an oil hole in the side thereof at a point coinciding generally with the stated sleeve opening, and a wick extending from the bottom of said oil-well to the oil hole of said bushing, said oil-well having a filling opening accessible from the exterior of said end-cap.

ARTHUR W. SEYFRIED.